United States Patent
Ruel et al.

(10) Patent No.: US 6,793,436 B1
(45) Date of Patent: Sep. 21, 2004

(54) CONNECTION SYSTEMS FOR REINFORCEMENT MESH

(75) Inventors: Steve Ruel, San Jose, CA (US); Dave Swanson, San Jose, CA (US)

(73) Assignee: SSL, LLC, Scotts Valley, CA (US)

( * ) Notice: Subject to any disclaimer, the term of this patent is extended or adjusted under 35 U.S.C. 154(b) by 0 days.

(21) Appl. No.: 10/000,929

(22) Filed: Oct. 23, 2001

Related U.S. Application Data

(60) Provisional application No. 60/243,222, filed on Oct. 23, 2000.

(51) Int. Cl.$^7$ ................................................. F16B 1/00
(52) U.S. Cl. ..................... 403/316; 403/208; 403/209; 403/213; 403/408.1; 405/262; 405/284; 405/302.7; 52/253; 52/583.1
(58) Field of Search ........................... 256/65.04, 65.16, 256/32, 33, 47–49, 51, 52; 403/209, 210, 213, 316, 317, 207, 218, 408.1, 294, 345, 346, 353, 187, 188; 405/262, 284, 285, 286, 302.4, 302.6, 302.7; 21/573.09; 292/162, 145, 148, 150, DIG. 13, 281, 283; 52/125.5, 253, 583

(56) References Cited

U.S. PATENT DOCUMENTS

| | | | |
|---|---|---|---|
| 979,285 A | * | 12/1910 | Gilligan ..................... 138/175 |
| 3,922,864 A | | 12/1975 | Hilfiker |
| 4,068,482 A | | 1/1978 | Hilfiker |
| 4,117,686 A | | 10/1978 | Hilfiker |
| 4,154,554 A | | 5/1979 | Hilfiker |
| 4,260,296 A | | 4/1981 | Hilfiker |
| 4,266,890 A | | 5/1981 | Hilfiker |
| 4,324,508 A | | 4/1982 | Hilfiker et al. |
| 4,329,089 A | | 5/1982 | Hilfiker et al. |
| 4,343,572 A | | 8/1982 | Hilfiker et al. |
| 4,391,557 A | | 7/1983 | Hilfiker et al. |
| 4,407,611 A | | 10/1983 | Murray et al. |
| 4,449,857 A | | 5/1984 | Davis |
| 4,505,621 A | | 3/1985 | Hilfiker et al. |
| 4,529,174 A | | 7/1985 | Pickett |
| 4,581,907 A | * | 4/1986 | Eberly ..................... 292/281 X |
| 4,616,959 A | | 10/1986 | Hilfiker |
| 4,643,618 A | | 2/1987 | Hilfiker et al. |
| 4,661,023 A | | 4/1987 | Hilfiker |
| 4,684,287 A | | 8/1987 | Wojciechowski |

(List continued on next page.)

Primary Examiner—Lynne H. Browne
Assistant Examiner—Michael P. Ferguson
(74) Attorney, Agent, or Firm—Michael R. Schacht; Schacht Law Office, Inc.

(57) ABSTRACT

A connecting system for connecting a first mesh sheet to a member comprising a housing member, a first loop portion, and a first pin member. The housing member defines a loop passageway, and the housing member is adapted to be rigidly connected to the member. The first loop portion is formed on the first mesh sheet and extends into the loop passageway. The first pin member extends through the first loop portion of the first mesh sheet such that a force applied to the first mesh sheet away from the housing member causes the first pin member to engage the housing member and the loop portion to inhibit movement between the first mesh sheet and the member. In one preferred embodiment, the member is a concrete panel. In another preferred embodiment, the member is a second mesh sheet.

2 Claims, 4 Drawing Sheets

U.S. PATENT DOCUMENTS

| | | | |
|---|---|---|---|
| 4,725,170 A | * 2/1988 | Davis | 405/286 |
| 4,815,897 A | 3/1989 | Risi et al. | |
| 4,824,293 A | 4/1989 | Brown et al. | |
| 4,834,584 A | 5/1989 | Hilfiker | |
| 4,856,939 A | 8/1989 | Hilfiker | |
| 4,929,125 A | 5/1990 | Hilfiker | |
| 4,952,098 A | 8/1990 | Grayson et al. | |
| 4,961,673 A | 10/1990 | Pagano et al. | |
| 4,992,005 A | 2/1991 | Hilfiker | |
| 4,993,879 A | * 2/1991 | Hilfiker | 405/262 |
| 5,028,172 A | 7/1991 | Wilson et al. | |
| 5,044,833 A | 9/1991 | Wilfiker | |
| 5,064,313 A | 11/1991 | Risi et al. | |
| 5,076,735 A | 12/1991 | Hilfiker | |
| 5,158,399 A | 10/1992 | Flores | |
| 5,259,704 A | 11/1993 | Orgorchock | |
| 5,484,235 A | 1/1996 | Hilfiker | |
| 5,492,438 A | 2/1996 | Hilfiker | |
| 5,494,379 A | 2/1996 | Anderson et al. | |
| 5,511,910 A | 4/1996 | Scales | |
| 5,531,547 A | 7/1996 | Shimada | |
| 5,622,455 A | 4/1997 | Anderson et al. | |
| 5,642,968 A | 7/1997 | Anderson et al. | |
| 5,647,695 A | 7/1997 | Hilfiker et al. | |
| 5,671,582 A | * 9/1997 | Reay | 52/745.05 |
| 5,722,799 A | 3/1998 | Hilfiker | |
| 6,050,748 A | * 4/2000 | Anderson et al. | 405/262 |
| 6,086,288 A | 7/2000 | Ruel et al. | |

* cited by examiner

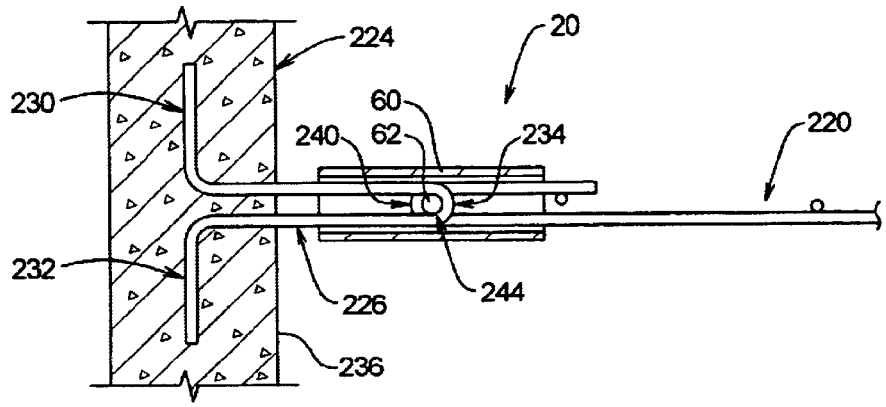
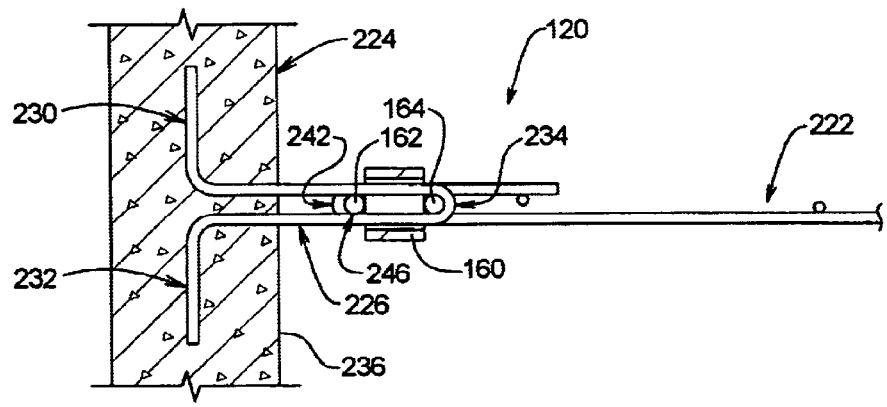
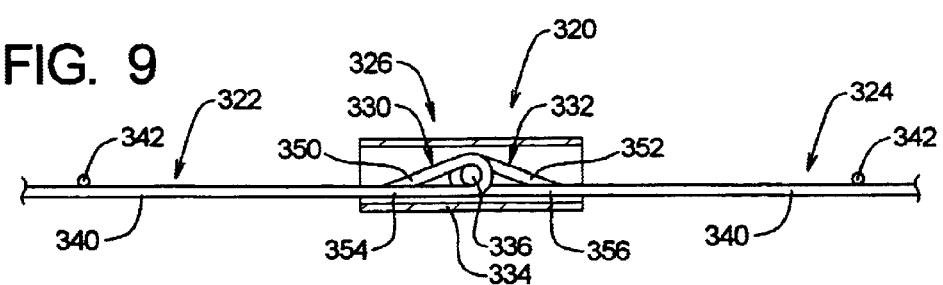

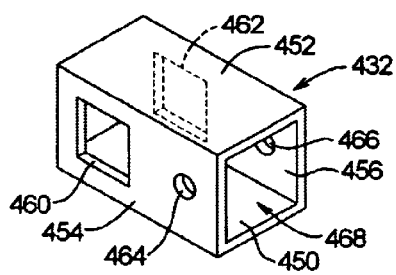
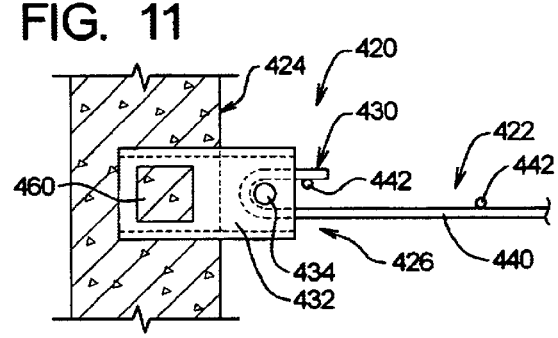
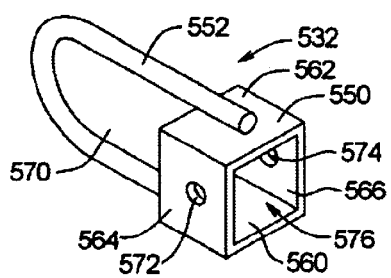
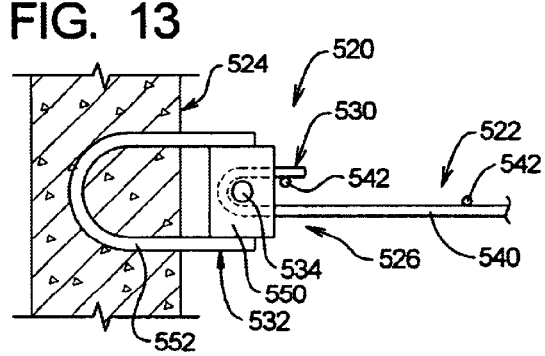
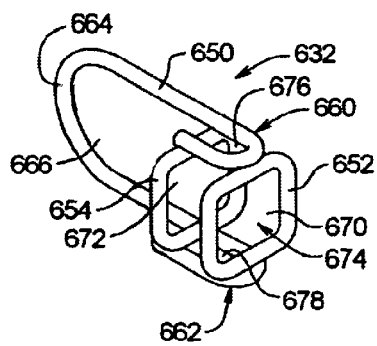
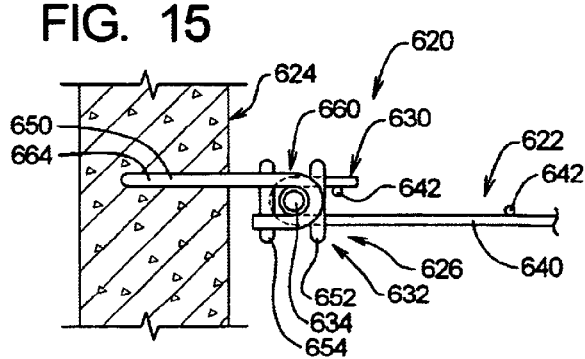

1

CONNECTION SYSTEMS FOR REINFORCEMENT MESH

RELATED APPLICATIONS

This application claims priority of U.S. Provisional Patent Application Serial No. 60/243,222, which was filed on Oct. 23, 2000.

TECHNICAL FIELD

The present invention relates to systems and methods for connecting sheet material and, in particular, to systems and methods for connecting a reinforcement mesh sheet to other objects such as another reinforcement mesh sheet or a wall panel.

BACKGROUND OF THE INVENTION

Reinforcement mesh is an array of metal bars welded together in a grid. A common use of reinforcement mesh is to bury the mesh within an earthen wall; an edge of the mesh is connected to a wall panel arranged to reinforce the earthen wall. The reinforcing mesh reinforces the wall panel(s) against loads applied by the earthen wall on the wall panel. Reinforcing mesh may also be used in other environments.

Reinforcement mesh is normally provided in sheets; these sheets often need to be connected to what will be referred to herein as the "remote object". The remote object may be another sheet of reinforcing mesh or other objects such as the wall panels. In many situations, each metal bar extending in one direction within the sheet must be connected to the remote object to take full advantage of the reinforcing mesh. Connecting each metal bar to the remote object by welding or the like can be expensive and time consuming and require relatively skilled labor. In addition, conventional methods increase the likelihood that one of the any separate connections is faulty and thus may require extensive quality control provisions.

The need thus exists for systems and methods for connecting sheets of reinforcing mesh that are simple, fast, inexpensive, and reliable.

SUMMARY OF THE INVENTION

The present invention may be embodied as a connecting system for connecting a first mesh sheet to a member comprising a housing member, a first loop portion, and a first pin member. The housing member defines a loop passageway, and the housing member is adapted to be rigidly connected to the member. The first loop portion is formed on the first mesh sheet and extends into the loop passageway. The first pin member extends through the first loop portion of the first mesh sheet such that a force applied to the first mesh sheet away from the housing member causes the first pin member to engage the housing member and the loop portion to inhibit movement between the first mesh sheet and the member.

In one preferred embodiment, the member is a concrete panel. In this case, the housing member comprises an anchor portion adapted to be embedded in the concrete panel to rigidly connect the housing member to the concrete panel.

In another preferred embodiment, the member is a second mesh sheet. In this case, the connecting system further comprises a second loop portion formed on the second mesh sheet and the first pin member extends through at least one of the first and second loop portions to inhibit relative movement between the first and second mesh sheets.

BRIEF DESCRIPTION OF THE DRAWINGS

FIG. 7 is a side elevation cut-away view of the connection system of FIG. 1 being used to connect reinforcing mesh to a wall panel; and FIG. 8 is a side elevation cut-away view of the connection system of FIG. 1 being used to connect reinforcing mesh to a wall panel.

FIG. 9 is a side cut-away view depicting yet another embodiment of a connecting system of the present invention;

FIG. 10 is a perspective view of a housing member of another embodiment of the present invention;

FIG. 11 is a perspective view of a connecting system using the housing member of FIG. 10;

FIG. 12 is a perspective view of a housing member of another embodiment of the present invention;

FIG. 13 is a perspective view of a connecting system using the housing member of FIG. 12;

FIG. 14 is a perspective view of a housing member of another embodiment of the present invention; and FIG. 15 is a perspective view of a connecting system using the housing member of FIG. 14.

DETAILED DESCRIPTION OF THE INVENTION

Figure 1:
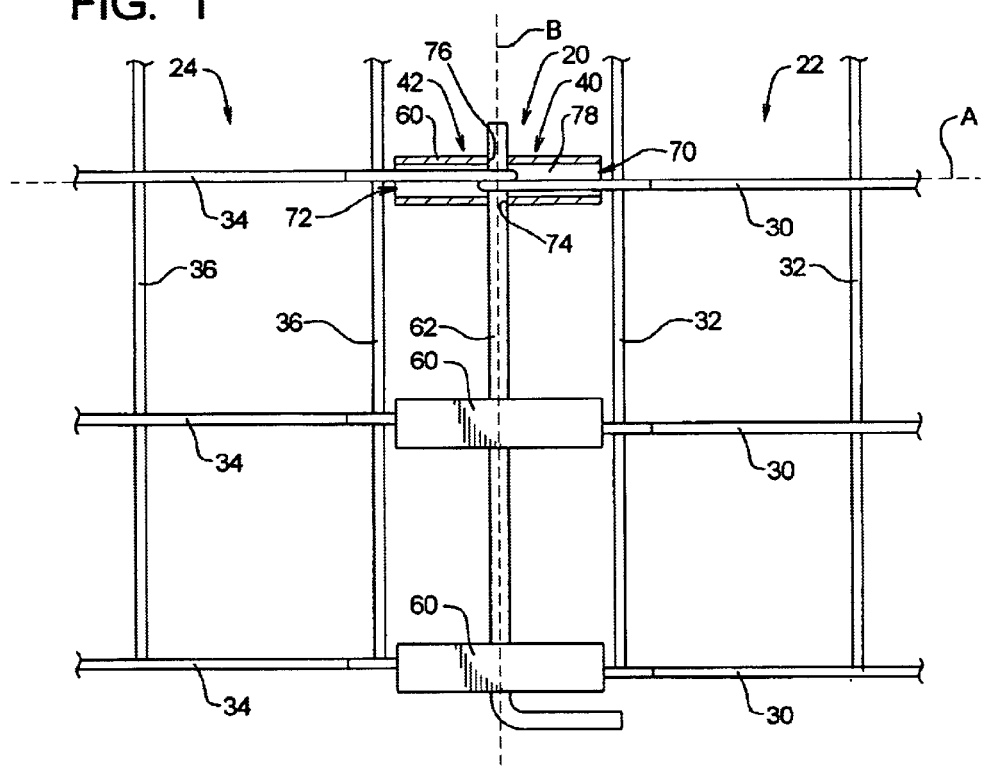
FIG. 1 is a top plan, partial cut-away view depicting a first embodiment of an connection system constructed in accordance with, and embodying, the principles of the present invention.
Figure 2:
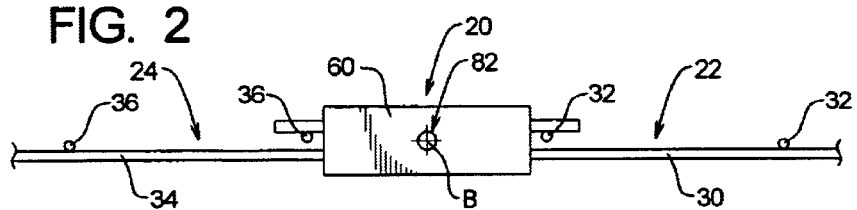
FIG. 2 is a side elevation view of the connection system of FIG. 1 with a pin member thereof removed.
Figure 3:
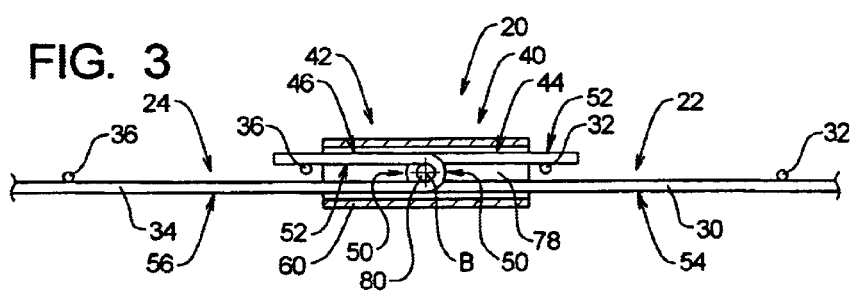
FIG. 3 is a side elevation, partial cut-away view of the connection system of the present invention as depicted in FIG. 2.

Referring initially to FIGS. 1–3 of the drawing, depicted at 20 therein is a first embodiment of a connecting system of the present invention. In FIGS. 1–3, the connecting system 20 connects a first mesh panel 22 to a second mesh panel 24.

In particular, the first mesh panel 22 comprises a plurality of longitudinal elongate members or bars 30 and transverse elongate members or bars 32 arranged in a grid. The longitudinal members 30 are arranged in a first direction, while transverse members 32 are arranged in a second direction; conventionally, the transverse members 32 are connected by welding or the like across the longitudinal members 30 such that a right angle is formed between the longitudinal members 30 and the transverse members 32. Other configurations of and angles between the elongate members 30 and 32 are possible, however. In addition, the elongate members 30 and 32 can be the same gauge and length, but will likely be of different gauges and lengths depending upon the circumstances.

The second mesh panel 24 is similarly constructed of longitudinal and transverse elongate members 34 and 36 but need not be identical to the first mesh panel 24. Preferably, the spacing between the longitudinal members 30 of the first mesh panel 24 is the same as the spacing between the longitudinal members 34 of the second panel 24, but this spacing is not necessary to implement the present invention in its broadest form.

The first mesh panel 22 defines a first connecting edge 40, while the second mesh panel 24 defines a second connecting edge 42. In preferred embodiment depicted in FIG. 1, the connecting edges 40 and 42 are defined by end sections 44 and 46 (FIG. 3) of the longitudinal members 30 and 34 of the panels 22 and 24. In this example, the end sections 44 and 46 extend beyond the lateral members 32 and 36 closest to the connecting edges 40 and 42.

The exemplary connecting edges 40 and 42 are formed by bending the end sections 44 and 46 of the longitudinal members 30 and 34 to define loop portions 50 and return portions 52. The loop portions 50 extend around a 180° arc such that the return portions 52 are substantially parallel to main sections 54 and 56 of the longitudinal members 30 and 34.

Alternatively, the connecting edges 40 and 42 may be formed distal from the end sections 44 and 46. In particular, one or both of the mesh panels 22 and 24 may be folded back over on itself such that the connecting edges 40 and 42 are formed by the main sections 54 and 56 of the longitudinal members 30 and 34.

The connecting system 20 comprises the connecting edges 40 and 42, a plurality of pin housings 60, and a pin member 62. The pin housings 60 are provided for each juncture formed between the longitudinal members 30 of the first panel 22 and a corresponding longitudinal member 34 of the second panel 24. The pin member 62 is used for at least one and preferably a plurality of the pin housings 60. Not every longitudinal member 30 and its corresponding longitudinal member 34 need be joined to practice the present invention. However, the present invention is optimized when a pin housing 60 is used for each juncture and a single pin member 62 extending through all of the pin housings 60 associated with a given panel or panels 22 and 24.

The exemplary pin housings 60 are hollow, rectangular boxes defining first and second loop openings 70 and 72 and first and second pin openings 74 and 76. The loop openings 70 and 72 are aligned along a connecting axis A, while the pin openings 74 and 76 are aligned along a pin axis B. A loop passageway 78 extends through the pin housing 60 between the first and second loop openings 70 and 72.

The exemplary pin member 60 is an elongate rigid member and can be made of the same material from which the elongate members 30–36 are made. The pin member 60 may, however, be made of a different (usually heavier) gauge material than the material used to form the elongate members 30–36.

The connection between the exemplary panels 22 and 24 is formed as follows. The loop portions 50 of the longitudinal member end sections 44 and 46 are Inserted into the pin housings 60 through the loop openings 70 and 72 along the loop passageway 78 such that the loop portions 50 extend beyond each other and define a pin channel 80 (FIG. 3). The pin channels 80 are aligned with the pin openings 74 and 76 in the pin housings 60 to form a pin passageway 82 (FIG. 2). The pin member 62 is inserted along the pin passageway 82 such that the pin member 62 extends through the pin openings 74 and 76 and pin channels 80 associated with each of the pin housings 60.

Accordingly, if loads are applied to the panels 22 and 24 that tend to separate these panels 22 and 24 and place the connecting system 20 in tension, the loop portions 50 engage the pin member 62 to prevent separation of the panels 22 and 24. The pin housings 60 engage the is return portions 52 to prevent these tension loads from straightening out the end sections 44 and 46 of the longitudinal members 30 and 34.

Figure 4:
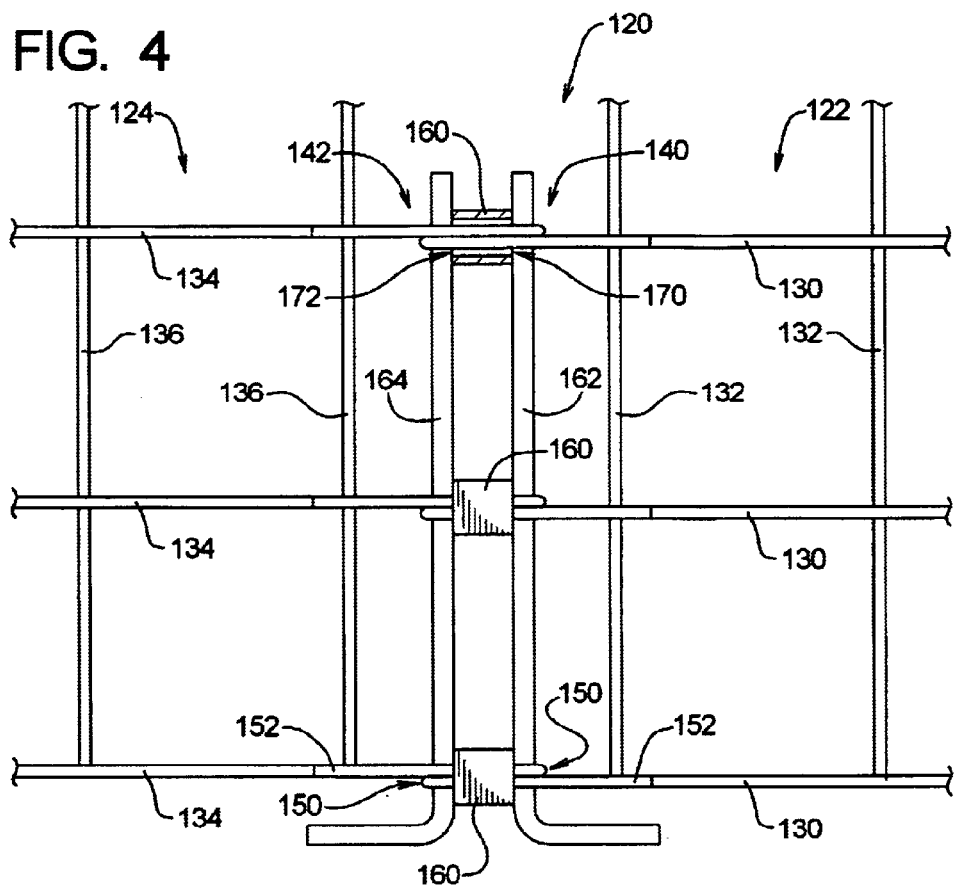
FIG. 4 is a top plan, partial cut-away view depicting a second embodiment of an connection system constructed in accordance with, and embodying, the principles of the present invention.
Figure 5:
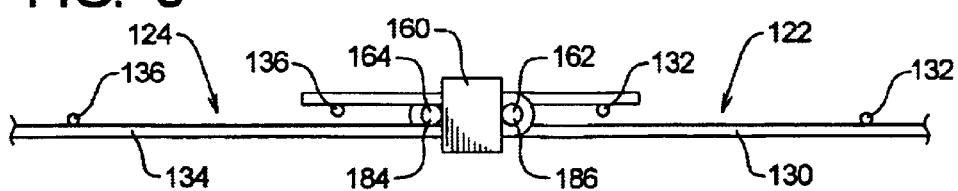
FIG. 5 is a side elevation view of the connection system of FIG. 4 with a pin member thereof removed.
Figure 6:
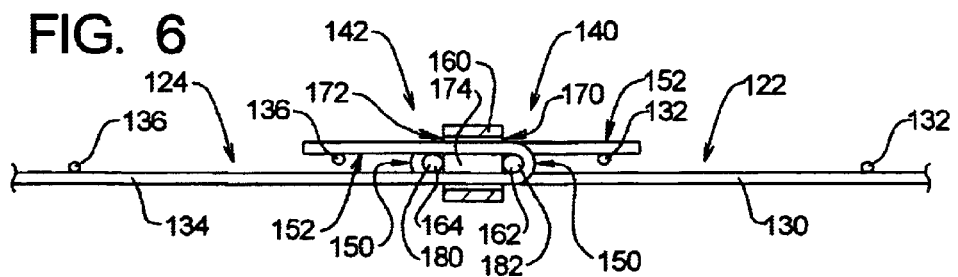
FIG. 6 is a side elevation, partial cut-away view of the connection system of the present invention as depicted in FIG. 5.

Referring now to FIGS. 4–6 of the drawing, depicted at 120 therein is a second embodiment of a connecting system of the present invention. In FIGS. 4–6, the connecting system 120 connects a first mesh panel 122 to a second mesh panel 124.

The exemplary first and second mesh panels 122 and 124 are substantially the same as the panels 22 and 24 described above and will not be described herein in detail. In the following discussion, elements of the panels 122 and 124 that are the same as those of the panels 22 and 124 described above will be given the same reference character plus 100.

The connecting system 120 comprises the connecting edges 140 and 142, a plurality of pin housings 160, and first and second pin members 162 and 164. The pin housings 160 are provided for each juncture formed between the longitudinal members 130 of the first panel 122 and a corresponding longitudinal member 134 of the second panel 124. The pair of pin members 162 and 164 are used for at least one and preferably a plurality of the pin housings 160. Not every longitudinal member 130 and its corresponding longitudinal member 134 need be joined to practice the present invention. However, the present invention as embodied in the system 120 is optimized when a pin housing 160 is used for each juncture and pair of pin member 162 and 164 engages all of the pin housings 160 associated with a given panel or panels 122 and 124.

The exemplary pin housings 160 are hollow, rectangular boxes defining first and second loop openings 170 and 172. A loop passageway 174 extends through the pin housings 160 between the loop openings 170 and 172.

The exemplary pin members 160 and 162 are elongate rigid members similar to the pin member 62 and can be made of the same material from which the elongate members 130–136 are made.

The connection between the exemplary panels 122 and 124 is formed as follows. The loop portions 150 of the longitudinal member end sections 144 and 146 are inserted into the pin housings 160 through the loop openings 170 and 172 and along the loop passageway 174 such that the loop portions 150 extend beyond each other and define first and second pin channels 180 and 182 (FIG. 6). The pin channels 180 and 182 of adjacent pin housings 160 are aligned with each other to define first and second pin passageways 184 and 186 (FIG. 5). The pin members 162 and 164 are inserted along the pin passageways 184 and 186 such that the pin housings 160 are arranged between loop portions of the pin members 162 and 164.

Accordingly, if loads are applied to the panels 122 and 124 that tend to separate these panels 122 and 124 and place the connecting system 120 in tension, the loop portions 150 of the longitudinal members 130 engage the first pin member 162 and the loop portions 150 of the longitudinal members 134 engage the second pin member 164. The pin members 162 and 164 in turn engage the pin housings 160, which maintains a predetermined minimum spacing between the first and second pin members 162 and 164. The tension loads on the panels 122 and 124 are thus passed through the pin members 162 and 164 and through the pin housings 160. The pin housings 160 engage the return portions 152 to prevent these tension loads from straightening out the end sections 144 and 146 of the longitudinal members 130 and 134.

Referring now to FIGS. 7 and 8, depicted therein are different environments in which one or both of the connecting systems 20 and 120 may be used. In particular, in FIG. 7 the connecting system 20 is used to connecting a sheet 220 of reinforcing mesh to a wall panel 224. In FIG. 8, the connecting system 120 is used to connecting a sheet 222 of reinforcing mesh to the wall panel 224.

The exemplary wall panel 224 is made of reinforced concrete, but other materials are possible. Embedded in the wall panel 224 are one or more connecting members 226 bent in a generally U-shape configuration to define first and second end portions 230 and 232 and a loop portion 234. The end portions 230 and 232 are embedded in the wall panel 224 and the loop portion 234 extends rearwardly from a rear surface 236 of the wall panel 224.

The loop portions 234 of the connecting members 226 extend within the pin housings 60 and/or 160 of the connecting systems 20 and/or 120 in the same manner as the loop portions 50 and 150 described above. Referring initially to FIG. 7, a loop portion 240 of the first sheet 220 also extends into the pin housing 60 to define, with the loop portion 234, a pin passageway 244. The pin member 62 of the connecting system 20 extends through the pin passageway 244 to engage the loop portion 234 of the connecting member 226 and the loop portion 240 of the reinforcing sheet 220. The pin member 62 prevents movement of the sheet 220 relative to the connecting member(s) 226, and thus the wall panel 224, under tension loads.

Similarly, FIG. 8 shows that a loop portion 242 of the second sheet 222 extends into the pin housing 160 to define, with the loop portion 234, a pin passageway 246. The pin member 162 of the connecting system 120 extends through the pin passageway 246 to engage the loop portion 234 of the connecting member 226 and the loop portion 242 of the reinforcing sheet 222. The pin member 162 prevents movement of the sheet 222 relative to the connecting member(s) 226, and thus the wall panel 224, under tension loads.

Referring now to FIG. 9, depicted at 320 therein is an alternative form of the present invention in which two sheets 322 and 324 of reinforcing mesh are joined together by a connection system 326. The connection system 326 is formed by closed loop portions 330 and 332 of the mesh sheets 322 and 324, a connecting housing 334, and a connecting pin 336.

The mesh sheets 322 and 324 each comprise longitudinal members 340 and transverse members 342. The closed loop portions 330 and 332 are formed by bending ends 350 and 352 of longitudinal members 340 of the sheets 322 and 324 back onto main portions 354 and 356, respectively, of these members 340. The ends 350 and 352 are welded to the main portions 354 and 356 of the longitudinal members 340 to form the closed loop portions 330 and 332.

The loop portions 330 and 332 are inserted into the housing 334, and the connecting pin 336 is inserted through the housing 334 and the loop portions 330 and 332 to prevent relative movement between the sheets 322 and 324 when the longitudinal members 340 are either placed in tension or forced towards each other.

Referring now to FIGS. 10 and 11, depicted at 420 therein is an alternative form of the present invention in which a sheet 422 of reinforcing mesh is joined to a concrete panel 424 by a connection system 426. The connection system 426 is formed by a loop portion 430 of the mesh sheet 422, a housing member 432, and a connecting pin 434. Aside from the loop portion 430, the mesh sheet 422 is conventional and comprises longitudinal members 440 and transverse members 442.

The exemplary housing member 432 is a box-like member comprising bottom, top, first side, and second side walls 450, 452, 454, and 456; the remaining sides are open. Anchor openings 460 and 462 and pin openings 464 and 466 are formed in the side walls 454 and 456. The anchor opening 460 and pin opening 464 is formed in the left side wall 454, and the anchor opening 462 and pin opening 466 are formed in the right side wall 456. A loop passageway 468 extends through the housing member 432.

The housing member 432 is cast partly into the concrete panel 424 with the anchor openings 460 and 462 within the panel 424 and the pin openings 464 and 466 outside of the panel 424. The anchor openings 460 and 462 allow concrete to flow inside the housing member 432. These anchor openings 460 and 462 thus help prevent a void from being formed in the panel 424 and increase resistance to pull-out when the connecting system 426 is placed in tension.

To connect the mesh sheet 422 to the panel 424, the loop portion 430 is inserted into the housing member 432 along the loop passageway 468 through one of the open sides. The connecting pin 434 is then inserted through one of the pin openings 464, through the loop portion 430, and then through the other of the pin openings 466. The connecting pin 434 thus engages the housing member 432 to prevent the loop portion 430 from being withdrawn from the housing member 432 when the connecting system is placed in tension.

When a force is applied on the longitudinal member 440 towards the panel 424, the loop portion 430 will engage the panel 424, at which point the connecting system 426 will resist further movement of the mesh sheet 422 towards the panel 424.

Referring now to FIGS. 12 and 13, depicted at 520 therein is an alternative form of the present invention in which a sheet 522 of reinforcing mesh is joined to a concrete panel 524 by a connection system 526. The connection system 526 is formed by a loop portion 530 of the mesh sheet 522, a connecting assembly 532, and a connecting pin 534. Aside from the loop portion 530, the mesh sheet 522 is conventional and comprises longitudinal members 540 and transverse members 542.

The exemplary connecting assembly 532 comprises a housing member 550 and an anchor member 552. The housing member 550 comprises lower, upper, first side, and second side walls 560, 562, 564, and 566; the remaining sides are open. The anchor member 552 is securely attached bo the lower and upper walls 560 and 562 by welding or the like. The anchor member 552 forms an anchor opening 570, while the side walls 554 and 556 of the housing member 550 define first and second pin openings 572 and 574. A loop passageway 576 extends through the open sides of the housing member 550.

The anchor member 552 of the connecting assembly 532 is cast partly into the concrete panel 524 with the anchor openings 570 partly to within the panel 524. The housing member 550 is outside of the panel 524 such that the pin openings 572 and 574 are accessible. The anchor opening 570 allows concrete to flow around the anchor member 552 such that the connecting assembly 532 is securely attached to the concrete panel 524 against pull-out when the connecting system 526 is placed in tension.

To connect the mesh sheet 522 to the panel 524, the loop portion 530 is inserted into the housing member 550 along the loop passageway 576 through one of the open sides. The connecting pin 534 is then inserted through one of the pin openings 564, through the loop portion 530, and then through the other of the pin openings 566. The connecting pin 534 thus engages the connecting assembly 532 to prevent the loop portion 530 from being withdrawn from the connecting assembly 532 when the connecting system is placed in tension.

When a force is applied on the longitudinal member 540 towards the panel 524, the loop portion 530 will engage the panel 524, at which point the connecting system 526 will resist further movement of the mesh sheet 522 towards the panel 524.

Referring now to FIGS. 14 and 15, depicted at 620 therein is an alternative form of the present invention in which a sheet 622 of reinforcing mesh is joined to a concrete panel 624 by a connection system 626. The connection system 626 is formed by a loop portion 630 of the mesh sheet 622, a connecting assembly 632, and a connecting pin 634. Aside from the loop portion 630, the mesh sheet 622 is conventional and comprises longitudinal members 640 and transverse members 642.

The exemplary connecting assembly 632 comprises a first housing ring 650, a second housing ring, and an anchor member 654. The anchor member 654 comprises first and second anchor loop portions 660 and 662 and an anchor portion 664. The anchor portion 664 defines an anchor opening 666. The housing rings 650 and 652 define first and second ring openings 670 and 672 and are connected to the anchor loop portions 660 and 662 to define a loop passageway 674. So connected, the anchor loop portions 660 and 662 and housing rings 650 and 652 further define pin openings 676 and 678.

The anchor portion 664 of the connecting assembly 632 is cast partly into the concrete panel 624 with the anchor opening 666 partly within the panel 624. The housing member 650 is outside of the panel 624 such that the pin openings 672 and 674 are accessible. The anchor opening 666 allows concrete to flow around the anchor member 664 such that the connecting assembly 632 is securely attached to the concrete panel 624 against pull-out when the connecting system 626 is placed in tension.

To connect the mesh sheet 622 to the panel 624, the loop portion 630 is inserted along the loop passageway 674 through the first ring opening 672. The connecting pin 634 is then inserted through one of the pin openings 672, through the loop portion 630, and then through the other of the pin openings 674. The connecting pin 634 thus engages the connecting assembly 632 to prevent the loop portion 630 from being withdrawn from the connecting assembly 632 when the connecting system is placed in tension.

When a force is applied on the longitudinal member 640 towards the panel 624, the pin member 634 will engage the second ring 652, at which point the connecting system 626 will resist further movement of the mesh sheet 622 towards the panel 624.

From the foregoing, it should be apparent that the present invention may be embodied in forms other than those described above.

In particular, the present invention as embodied in the connecting systems 20 and 120 may be used in many different environments to connect sheets of reinforcing mesh material to other remote objects. For example, instead of a concrete wall panel in which are embedded connecting members, the connecting members may be attached to or form of part of a wire mesh wall panel. The connecting system may thus be used to connect buried mesh to an exposed mesh wall panel that is arranged at a substantially right angle to the buried mesh.

The scope of the present invention thus may be broader than the exemplary preferred embodiments depicted and described herein.

What is claimed is:

1. A connecting system for connecting an anchor mesh sheet to a concrete wall panel comprising:
   a plurality of housing members each comprising an anchor member defining an anchor portion and first and second anchor loop portions, a housing portion, and first and second housing rings, where
      at least a portion of the anchor portion of each housing member is adapted to be embedded within the concrete wall panel,
      the housing portion defines a loop passageway and a pin passageway,
      the housing portion extends from the concrete wall panel, and
      the first and second housing rings and the anchor loop portions define first and second pin openings;
   a plurality of loop portions formed on the anchor mesh sheet, where each loop portion extends into an associated loop passageway; and
   a first pin member; wherein
   the first pin member extends through the pin passageways and each of the loop portions of the anchor mesh sheet such that a force applied to the anchor mesh sheet away from the housing members causes the first pin member to engage at least one of the housing members and at least one of the loop portions to inhibit movement between the anchor mesh sheet and the concrete wall panel.

2. A connecting system for connecting an anchor mesh sheet to a concrete wall panel comprising:
   a plurality of housing members each comprising an anchor member defining an anchor portion and first and second anchor loop portions, and first and second housing rings and defining a loop passageway, where
      at least a portion of the anchor portions of the housing members are adapted to be embedded within the concrete wall panel, and
      the first and second housing rings and the anchor loop portions define first and second pin openings;
   a plurality of loop portions formed on the anchor mesh sheet, where the loop portions each extend into one of the loop passageways; and
   a first pin member; wherein
   the first pin member extends through each of the loop portions of the anchor mesh sheet such that a force applied to the anchor mesh sheet away from the housing members causes the first pin member to engage the housing members and the loop portions to inhibit movement between the anchor mesh sheet and the concrete wall panel.

* * * * *